United States Patent [19]

Kieffer

[11] 4,294,297

[45] Oct. 13, 1981

[54] ROUTER GUIDE APPARATUS AND METHOD

[76] Inventor: Vincent C. Kieffer, 411 Highland Dr., Gretna, Nebr. 68028

[21] Appl. No.: 28,985

[22] Filed: Apr. 11, 1979

[51] Int. Cl.³ .............................................. B27C 5/10
[52] U.S. Cl. .............................. 144/134 D; 33/27 L; 144/323; 409/182
[58] Field of Search ......................... 33/27 L; 409/182; 144/134 R, 134 D, 136 C, 323, 326 R

[56] References Cited

U.S. PATENT DOCUMENTS 2,609,018  9/1952  Bjorklund ....................... 144/134 D
4,197,887  4/1980  Groves ........................... 144/134 D Primary Examiner—W. D. Bray
Attorney, Agent, or Firm—Zarley, McKee, Thomte, Voorhees & Sease

[57] ABSTRACT

An apparatus and method for guiding a router bit relative to a guide surface on a workpiece includes a pair of guide pins adapted to be supported in generally fixed relation to the router bit and in spaced-apart relation from one another and the router bit. The guide pins are maintained in continuous engagement with the guide surface of the workpiece and moved therealong while the router bit cuts into the face of the workpiece to form a routed line thereon. In one embodiment, the guide pins are secured to the underside of the router tool at positions spaced apart from one another and radially spaced from the router bit protruding from the underside of the tool so that the router tool may be guided along the workpiece by the continuous engagement of the guide pins with the guide surface. In an alternate embodiment, the guide pins are supported in a selected pair of guide pin openings on a work surface with a router bit rotatably supported by a power drive mechanism in substantially horizontally fixed relation to the guide pins whereby a routed line is cut in a workpiece supported on the work surface upon movement of the workpiece with its guide surface maintained in continuous engagement with the guide pins.

18 Claims, 29 Drawing Figures

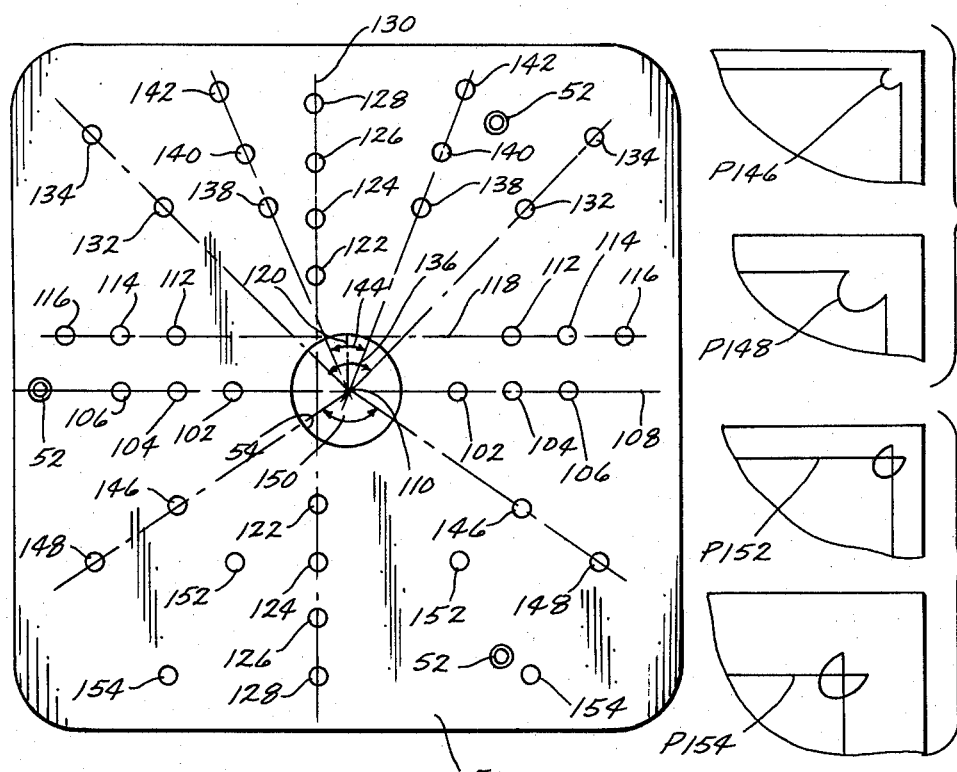

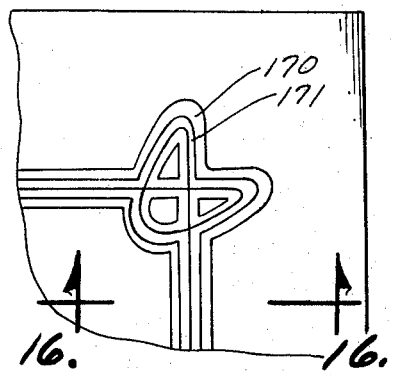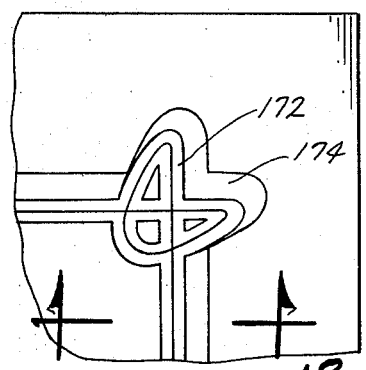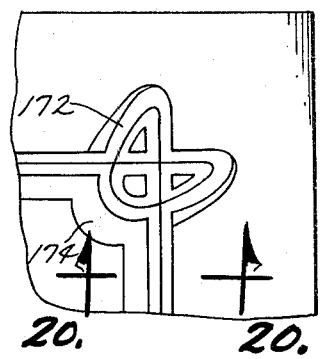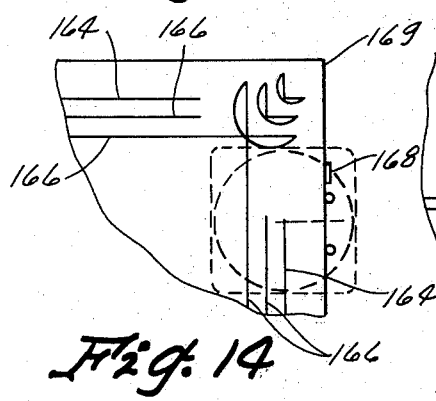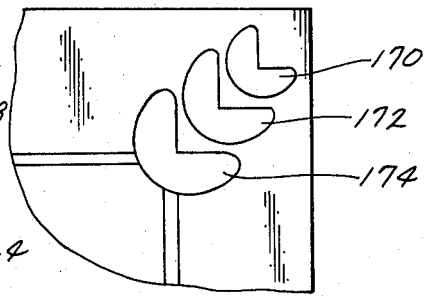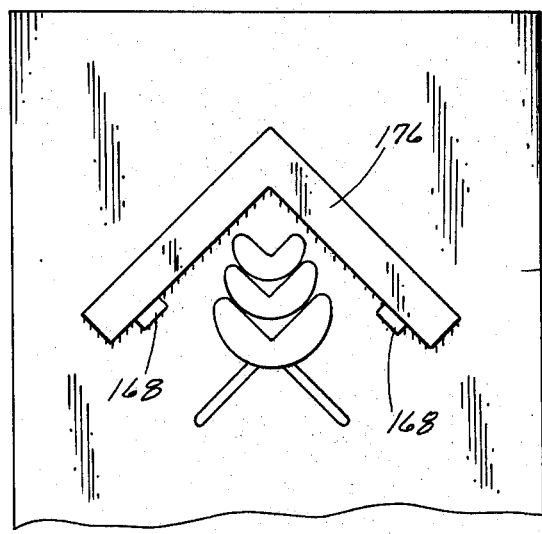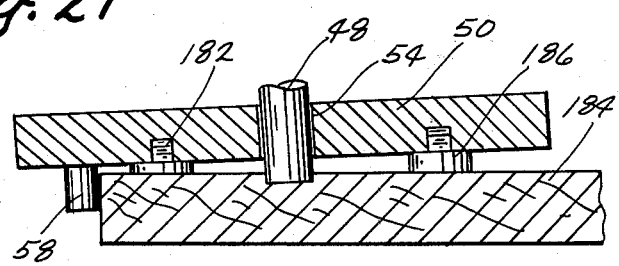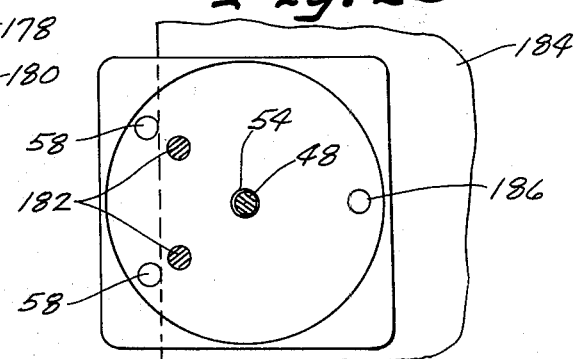

ROUTER GUIDE APPARATUS AND METHOD

BACKGROUND OF THE INVENTION

The present invention relates generally to an improved apparatus and method for guiding a router relative to a workpiece, and more particularly to a router guide apparatus and method wherein a pair of guide pins are maintained in continuous engagement with the guide surface of a workpiece as the guide pins and router bit are moved in unison relative to the workpiece.

The router is a valuable tool for finish carpentry because it is able to cut or scribe lines and patterns into the face of a workpiece. However, the fact that a router works on a face of a workpiece as opposed to one edge thereof raises the problem of how to guide the router along the workpiece to cut the desired pattern. This has generally been solved in the past by the use of templates clamped either to the workpiece or adjacent the workpiece. The router bit may be extended through a small sleeve which follows the edge of the template for guiding the router along the workpiece. Accordingly, templates have been required for cutting both straight and arcuate patterns. Arcuate patterns pose a particular problem in that the template must be cut to the complete contour desired. Generally wood templates are cut to the desired form with a jigsaw and extreme care must be used to produce smooth vertical surfaces. Finally, if several patterns are to be cut into the face of one corner of a workpiece, for example, several templates may be required and much time and energy is expended in the construction and interchanging of the various templates.

These problems are believed to be solved by the router guide apparatus and method of the present invention.

Accordingly, it is a primary object of the invention to provide an improved apparatus and method for guiding a router tool on a workpiece.

A further object is to provide a router guide apparatus and method wherein a pair of guide pins disposed in fixed relation to the router bit are advanced relative to a guide surface on a workpiece.

A further object is to provide a router guide apparatus and method wherein the guide pins may be advanced along an edge of the workpiece so that no template is required.

A further object of the invention is to provide a router guide apparatus and method wherein only linear guide surfaces are required for even the cutting of arcuate patterns.

A further object is to provide a router guide apparatus and method wherein several different patterns may be cut in a workpiece with the router being guided along the same stationay guide surface for each cut.

Finally, an object is to provide a router guide apparatus and method which is simple in construction, durable in use and efficient in operation.

SUMMARY OF THE INVENTION

The router guide apparatus and method of the present invention utilizes a pair of guide pins disposed in fixed relation to the router bit so that when the guide pins are maintained in engagement with the guide surface of a workpiece and advanced therealong, a predetermined or guided pattern is cut in the face of the workpiece. The guide surface may be either the edge of a workpiece, in which case no template is required whatsoever, or it may be the edge of a guide block clamped onto the workpiece for cutting patterns on the workpiece at a location remote from its edges. For a conventional handheld router tool, a pair of guide pins are secured in protruding relation from the underside of the router tool at positions spaced apart from one another and radially spaced from the bit. For this purpose, a subbase plate having a plurality of guide pin openings may be secured to the underside of the router tool to provide various combinations of guide pin locations relative to the router bit. In other embodiments, the guide pins may be supported on a work surface on which a workpiece is supported with its guide surface in engagement with the guide pins. A power means such as a radial arm saw or drill press may rotatably support a router bit in substantially fixed relation to the guide pins for cutting a pattern in the workpiece as it is moved on the work surface with its guide surface in continuous engagement with the guide pins.

The present invention enables peripheral lines or patterns to be cut adjacent the edge of a workpiece without any template or extraneous guide surface other than the edge of the workpiece itself. Furthermore, an infinite variety of arcuate patterns may be cut in a workpiece simply by advancing the guide pins about the corner formed by intersecting straight edge guide surfaces. In addition, by varying the guide pin locations relative to the router bit, several different patterns may be cut into the face of a workpiece using the same guide surface. Thus the use of a router is substantially simplified by the present invention by either eliminating the requirement of a template altogether and/or by enabling the cutting of intricate arcuate patterns with only straight guide surfaces for the router.

BRIEF DESCRIPTION OF THE DRAWINGS

FIG. 7 is an enlarged bottom view of the subbase plate;

FIG. 8 is a top plan view of workpieces displaying corner patterns cut when the guide pins are arranged to form an angle of greater than 90° with the router bit;

FIG. 9 is a top plan view of workpieces displaying corner patterns cut when the guide pins are arranged to form an angle of 90° with the router bit;

FIG. 10 is a top plan view of workpieces displaying a pattern cut when the guide pins are arranged to form an angle less than 90° with the router bit;

FIG. 11 is a top plan view of workpieces displaying an alternate corner pattern;

FIG. 12 is a top plan view of workpieces showing another alternate corner pattern;

FIG. 13 is a top plan view of workpieces displaying similar corner patterns alone and in combination;

FIG. 14 is a partial top plan view of a workpiece displaying an alternate combination of corner patterns;

FIGS. 15, 17 and 19 are partial top plan views showing various combination patterns formed by using two different router bits;

FIGS. 16, 18 and 20 are sectional views taken along lines 16—16, 18—18 and 20—20 in FIGS. 15, 17 and 19 respectively;

FIG. 21 is a partial top plan view of a workpiece displaying an alternate corner pattern;

FIG. 22 is a partial top plan view of a workpiece with a guide block positioned thereon;

FIG. 23 is a partially sectional side view of the subbase plate supported on a workpiece by tilt pins;

FIG. 24 is a reduced top plan view of the subbase plate and workpiece of FIG. 23;

DESCRIPTION OF THE PREFERRED EMBODIMENTS

Figure 1:
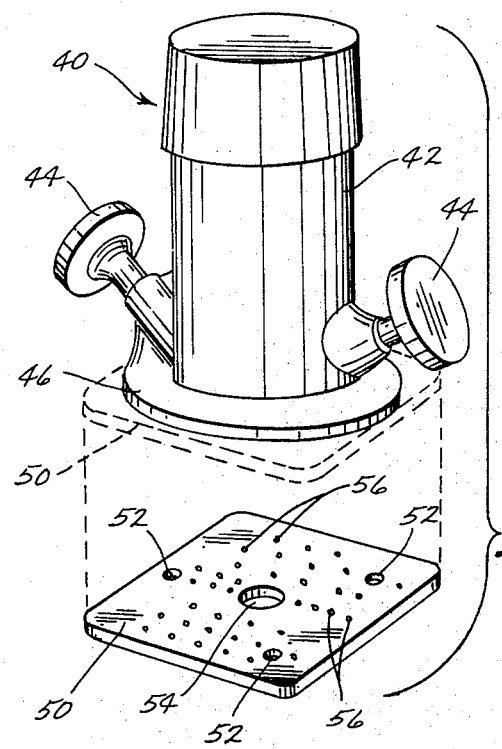
FIG. 1 is a perspective view of the subbase plate of the invention in assembly relation with a handheld router tool.
Figure 2:
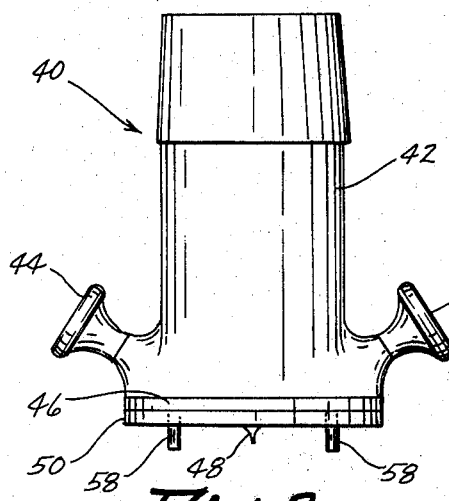
FIG. 2 is a side elevational view of the router and subbase plate assembly of FIG. 1.

Referring to FIGS. 1 and 2, there is shown a conventional handheld router tool 40 including a motor housing 42, handles 44, base plate 46 and a router bit 48 protruding from the underside of the router. The present invention is directed to the provision of a subbase plate 50 adapted to be secured to the underside of router 40 by bolts inserted through bolt holes 52. Subbase plate 50 has a tool opening 54 through which the router bit 48 protrudes for contacting a workpiece. The subbase plate 50 is also provided with a plurality of guide pin openings 56 for receiving a pair of guide pins 58 in selected positions relative to the bit 48.

Figure 3:
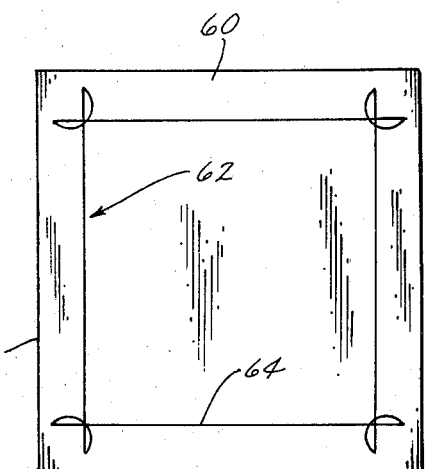
FIG. 3 is a top plan view of a workpiece showing a pattern cut therein by the router of FIG. 2.
Figure 4:
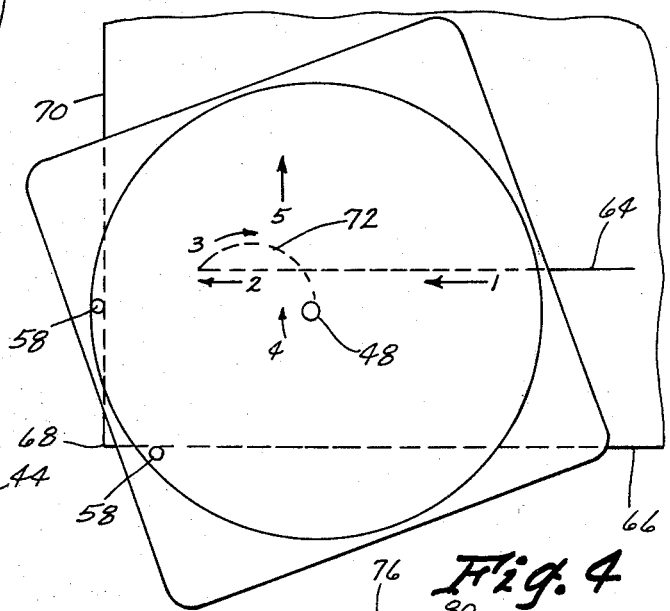
FIG. 4 is an enlarged detail top plan view of a corner of the workpiece of FIG. 3 showing the movement of the router relative thereto.

A workpiece 60 is shown in FIG. 3 having a routed pattern 62 cut therein by the router of FIG. 2. FIG. 4 shows the method by which each corner of the pattern 62 is cut. First, straight line 64 is cut by advancing the bit 48 across the workpiece 60 with both guide pins 58 in continuous engagement with one edge 66 of the workpiece. As the leading guide pin traverses corner 68 and moves along the adjacent edge 70 as the trailing guide pin approaches 68, the router bit is directed rearwardly cutting a curve 72, after which another straight line perpendicular to line 64 is cut when both guide pins are advanced along edge 70. Sequence numerals 1-5 and the associated arrows in FIG. 4 illustrate the movement of the router bit 48. Since the guide pins 58 position the router bit 48 relative to the edge of the workpiece, pattern 62 may be completely cut without any template as is usually required for guiding a router.

Figure 5:
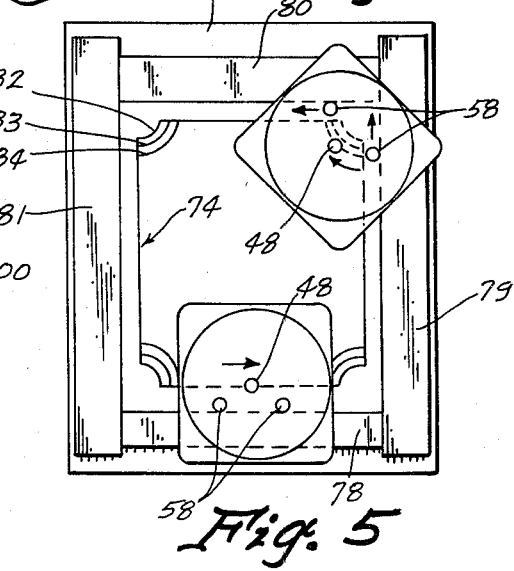
FIG. 5 is a top plan view of a workpiece showing a pattern being cut on the face thereof by a router guided along guide blocks thereon.

The present invention is not restricted to cutting patterns adjacent the edge of a workpiece however. In FIG. 5, a pattern 74 is cut on the face of a workpiece 76 by guiding router 40 about the workpiece with guide pins 58 in continuous engagement with guide blocks 78-81 which are clamped or otherwise secured relative to the face of workpiece 76. Note that three separate curves 82-84 are formed in each corner of pattern 74. This is accomplished by arranging the guide pins 58 in three selected pairs of guide pin openings 56 and traversing the interior edges of guide blocks 78-81 three times. The various combinations of guide pin locations and resultant patterns produced thereby are explained in greater detail hereinbelow.

Figure 6:
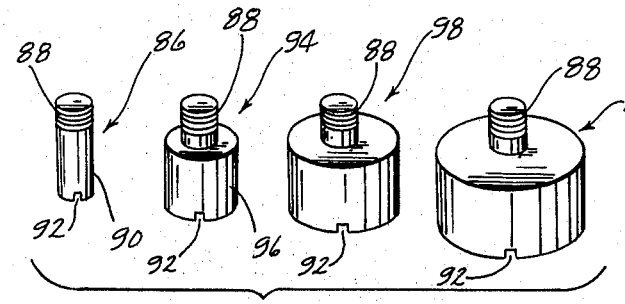
FIG. 6 is a perspective view of a series of guide pins having head portions of progressively increasing diameter.

The pattern generated by a router using a particular selected pair of guide pin openings 56 may be varied by inserting various sized guide pins into those openings. FIG. 6 shows four different guide pins. Guide pin 86 is shown as a stud of uniform diameter having a threaded shank portion 88 and a head portion 90 provided with a screwdriver slot 92 in the end thereof. Guide pin 94 has a similar shank portion 88 but the head portion 96 has a greater diameter than the shank portion 88. Guide pins 98 and 100 have head portions of further increased diameter.

The arrangement of guide pin openings 56 and subbase plate 50 is shown in detail in FIG. 7. Tool opening 54 is centrally located on the subbase plate and the guide pin openings 56 are arranged in matched pairs, with the holes of each pair being referenced by the same numeral.

A first set of guide pin openings 56 includes a plurality of pairs of holes 102, 104 and 106 which are aligned along a line 108 disposed in intersecting relation with the center 110 of tool opening 54, the holes of each pair being arranged on opposite sides of and equidistant from the center 110. These holes enable a line to be cut close to the workpiece edge by the method of FIG. 5.

A second set of guide pin openings 56 includes a plurality of pairs of holes 112, 114 and 116 aligned along a line 118 disposed in nonintersecting relation to the center 110 of tool opening 54, the holes of each pair being equidistant from the point of intersection 120 of a perpendicular line through the tool opening center 110. Referring to FIG. 8, patterns P112, P114 and P116 are cut when the router is guided by pins inserted into holes 112, 114 and 116 respectively. Note that the straight lines for each of these patterns are equidistant from the side of the respective workpiece because each pair of holes are offset from the tool opening center 110 by the same distance. Accordingly, when all three patterns are imposed on the same workpiece, the effect is that indicated in the lowermost illustration of FIG. 8.

Similarly, another set of guide pin openings 56 includes a plurality of pairs of holes 122, 124, 126 and 128 aligned along a line 130 disposed somewhat closer to the tool opening center 110 than is line 118. The patterns produced when guide pins are inserted in holes 122 through 128 are similar to the patterns shown in FIG. 8 except that the straight line portions are disposed closer to the edge of the workpiece or other guide surface as the case may be.

Another set of guide pin openings 56 includes pairs of holes 132 and 134 positioned so that the included angle between a pair of lines drawn through the tool opening center 110 and the centers of the respective holes is equal to 90° as indicated at 136. The holes of each pair 132 and 134 are positioned equidistant from the tool opening center 110. The patterns which are cut when guide pins 58 are inserted into holes 132 and 134 are shown at P132 and P134 respectively in FIG. 9. Note that since a line drawn through holes 134 is further from the tool opening center 110 than a line drawn through holes 132, the straight line portions of P134 are spaced further from the edge of the workpiece than the straight portions of P132.

Another set of guide pin openings 56 includes a plurality of pairs of holes 138, 140 and 142 positioned so that the included angle between a pair of lines drawn through the tool opening center 110 and the centers of the respective holes is less than 90° as indicated at 144. The router line patterns corresponding to holes 138, 140 and 142 are indicated at P138, P140 and P142 in FIG. 10 respectively. The movement of the router bit in cutting these patterns is as described earlier in connection with FIGS. 3 and 4.

Pairs of holes 146 and 148 are positioned so that the included angle between a pair of lines drawn through the tool opening center 110 and the centers of the respective holes is greater than 90° as indicated at 150. The corresponding routed patterns are indicated at P146 and P148 in FIG. 11. Finally, pairs of holes 152 and 154 are positioned so that the included angle between a pair of lines drawn through the tool opening center 110 and the centers of the respective holes is less than 90° but greater than the angle corresponding to holes 138, 140 and 142. The corresponding routed patterns are indicated at P152 and P154 in FIG. 12. The difference between the patterns of FIGS. 10 and 12 is that the arcuate portion of patterns in FIG. 10 intersect the intersection of the straight portions, thereby producing a flower-like design.

Reference is next made to FIG. 13. The same guide pin holes 112 were used to produce each of the patterns 156, 158, 160 and 162. Nevertheless, the arcuate portion of each successive pattern is larger and the straight line portions of the successive patterns are of increasing distant from the edge of the workpiece because different guide pins were used to form each pattern. Specifically, pairs of guide pins 86, 94, 98 and 100 correspond to the respective patterns 156, 158, 160 and 162. The combined effect of all four patterns is shown in the lowermost illustration of FIG. 13 and is achieved using the method of FIG. 5.

FIG. 14 illustrates one of an infinite variety of combination patterns which may be formed by router cuts with the guide pins inserted in selected pairs of holes. The flower-like design shown in FIG. 14 correspond to patterns P138, P140 and P142 in FIG. 10. The intercepted straight cuts 164 and 166 are made by using stops 168 clamped to the edge of the workpiece 169 or by putting a pencil mark on the edge of the workpiece as a stopping point.

The routed patterns can be varied further by using combinations of different router bits. For example, the pattern shown in FIGS. 15 and 16 is produced using guide pins 86 in holes 152. But the router traverses the pattern twice first using a square end or straight-face bit to cut a wide flat bottomed groove 170 and then changing to a V-groove chamfering bit for cutting groove 171. A further modification is shown in FIGS. 17–20. In FIGS. 17 and 18, a V-groove chamfering bit is used in combination with guide pins 86 in holes 152 to cut a V-groove 172 and a straightface bit is used in combination with guide pins 94 in holes 152 to cut a flat bottomed channel 174 exteriorly of the groove 172. Contrariwise, the pattern of FIGS. 19 and 20 is cut with the V-groove chamfering bit used in combination with guide pins 94 in holes 152 and the straight-face bit used in combination with guide pins 86 in holes 152.

A further pattern variation can be achieved by varying the cutting depth of the router bit for various portions of the pattern. For example, in FIG. 21, flower-like patterns 170, 172 and 174 are cut using a straight-face bit with guide pins 86 inserted in holes 138, 140 and 142 respectively. Patterns 170, 172 and 174 may be cut progressively deeper or progressively shallower for the desired aesthetic effect.

FIG. 22 illustrates that patterns such as that shown in FIG. 21 can be cut anywhere in a workpiece, not just in a corner. For this purpose, an L-shaped guide block 176 is clamped to the face 178 of workpiece 180 whereupon the guide surface for the router becomes the interior edge of guide block 176, as opposed to the edge of the workpiece as used in FIG. 21.

The flat-bottomed channels as illustrated in FIGS. 16, 18 and 20 may be inclined relative to the face of a workpiece by tilting the subbase plate 50 as shown in FIG. 23. For this purpose, two identical tilt pins 182 are positioned on the underside of the subbase plate 50 intermediate the bit 48 and guide pins 58 for supporting the subbase plate at a first height above the workpiece 184. Another tilt pin 86 is positioned on the underside of subbase plate 50 on the opposite side of tool opening 54 for supporting the subbase plate at a second height, whereby the subbase plate is tilted relative to the workpiece 184 as shown.

Figure 25:
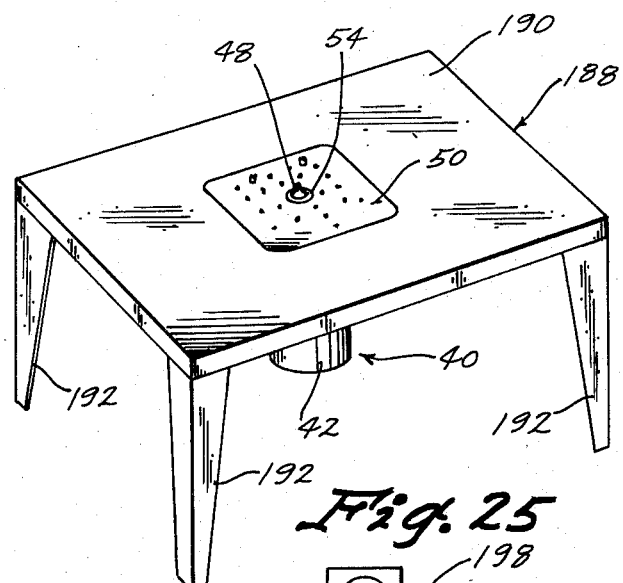
FIG. 25 is a perspective view of the subbase plate of the invention in assembly relation with a router table.

A router table 188 is shown in FIG. 25 as having a work surface 190 supported on legs 192. Subbase plate 50 is inset into the working surface 190 so as to be flush therewith. The router 40 is secured to the underside of the table so that the bit 48 protrudes upwardly through tool opening 54. Guide pins 58 are inserted into guide pin openings 56 just as in the embodiment of FIGS. 1 and 2 except that, with the router table, the workpiece is moved relative to the router bit, rather than vice versa. Accordingly, all of the previously described router patterns may be alternately cut using the table mounted router of FIG. 25.

Figure 27:
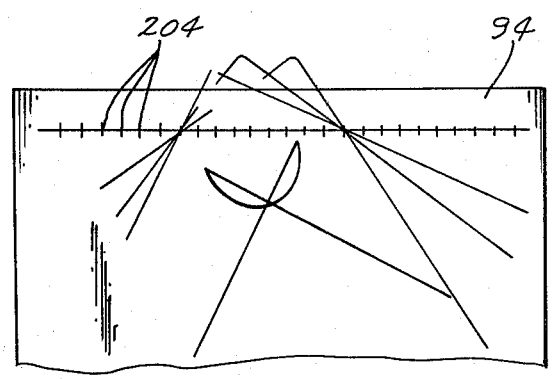
FIG. 27 is a partial diagrammatic top plan view showing the movement of a workpiece relative to the guide pins on a work surface.
Figure 26:
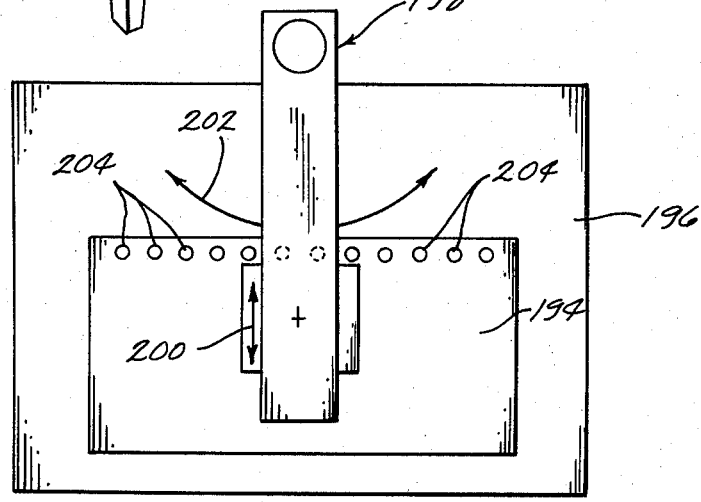
FIG. 26 is a top plan view of a radial arm saw equipped with the router guide apparatus of the invention.
Figure 28:
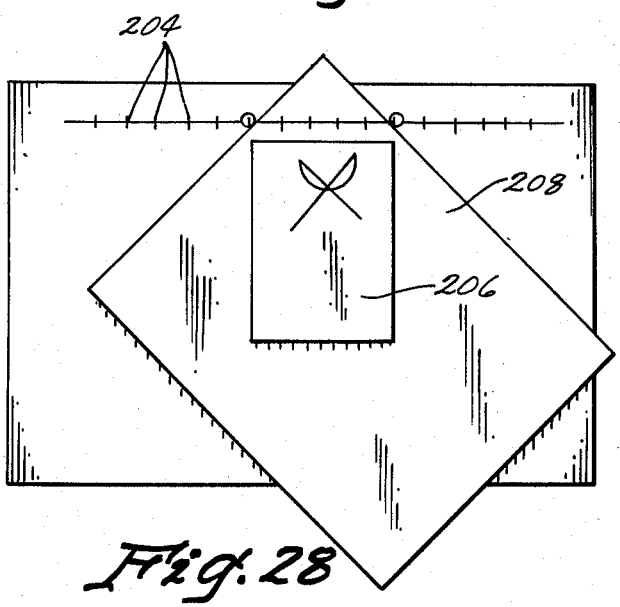
FIG. 28 is a top plan view showing a small workpiece in combination with a larger guide block.

Another embodiment of the invention is shown in FIG. 26 wherein a modified subbase plate 194 is clamped to the working surface 196 of a radial arm saw 198. The radial arm saw has a high speed spindle on the side opposite the saw blade. When a router bit chuck is placed on the spindle and the saw is rotated 90°, the router bits face downward and the radial arm saw is usable as a router. Since the router bit can thus be horizontally adjusted in the direction of arrow 200 and pivotally adjusted in the direction of arrow 202, only a single linear array of guide pin openings 204 are required for subbase plate 194. The radial arm saw is moved to an adjusted position whereupon it is secured in substantially horizontally fixed relation to a pair of guide pins in openings 204. A routed line is thus cut by moving a workpiece on the subbase plate 194 with the guide surface of the workpiece in continuous engagement with the guide pins as illustrated in FIG. 27. FIG. 28 shows a method for cutting a relatively large pattern on a relatively small workpiece by securing the small workpiece 206 to a larger guide block 208 and using the outer edge of the guide block as the guide surface for engagement with guide pins 58.

Figure 29:
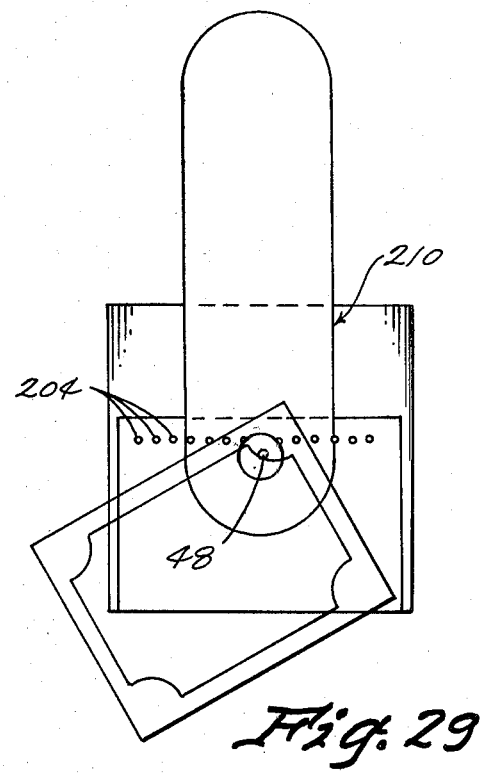
FIG. 29 is a diagrammatic top plan view of a drill press embodying the router guide apparatus of the invention.

The above-described application of the invention to a radial arm saw is equally applicable to a drill press 210 as indicated diagrammatically in FIG. 29.

With the drill press however, horizontal adjustment of the router bit relative to the guide pin openings is accomplished by moving the subbase plate, since the drill press tool is not horizontally adjustable.

Thus there has been shown and described a router guide apparatus and method which accomplishes at least all of the stated objects.

I claim:

1. An apparatus for guiding a router relative to a guide surface on a workpiece, said router having a rotatable bit protruding from the underside thereof, comprising,
   a pair of guide pins,
   means for securing the guide pins to the underside of said router at positions spaced apart from one another and radially spaced from the bit,
   said guide pins protruding from the underside of said router for continuous engagement with said guide surface as the router is advanced along the workpiece,
   said means for securing the guide pins comprising a subbase plate having a tool opening and a plurality of guide pin openings adapted to receive said guide pins and means for securing said subbase plate to the underside of the router with said tool opening positioned for protrusion of said bit through the center thereof,
   said guide pin openings including a plurality of pairs of guide pin holes aligned along a line disposed in nonintersecting relation to the center of said tool opening, the holes of each pair being equidistant from the point of intersection of said line and another line perpendicular thereto and passing through the center of said tool opening.

2. The apparatus of claim 1 wherein said guide pin openings include a pair of holes positioned so that the included angle between a pair of lines drawn through the center of said tool opening and the centers of the respective holes is less than 90°.

3. The apparatus of claim 2 wherein said subbase plate includes a plurality of pairs of holes, the holes of each pair being aligned on said pair of lines at positions equidistant from the center of said tool opening.

4. The apparatus of claim 1 wherein said guide pin openings include a pair of holes positioned so that the included angle between a pair of lines drawn through the center of said tool opening and the centers of the respective holes is substantially equal to 90°.

5. The apparatus of claim 4 wherein said subbase plate includes a plurality of pairs of holes, the holes of each pair being aligned on said pair of lines at positions equidistant from the center of said tool opening.

6. The apparatus of claim 1 wherein said guide pin openings include a pair of holes positioned so that the included angle between a pair of lines drawn through the center of said tool opening and the centers of the respective holes is greater than 90°.

7. The apparatus of claim 6 wherein said subbase plate includes a plurality of pairs of holes, the holes of each pair being aligned on said pair of lines at positions equidistant from the center of said tool opening.

8. The apparatus of claim 1 wherein said guide pin openings are tapped holes and said guide pins include threaded shanks for insertion into said tapped holes.

9. The apparatus of claim 8 wherein said guide pins are provided with screwdriver slots in one end thereof.

10. The apparatus of claim 1 wherein said guide pins include shank portions adapted for insertion into said guide pins openings and head portions adapted to be positioned externally of said guide pin openings for engaging said guide surface.

11. The apparatus of claim 10 wherein said shank portion and head portion are of substantially equal diameter.

12. The apparatus of claim 10 wherein said head portion is of substantially greater diameter than said shank portion.

13. An apparatus for guiding a router relative to a guide surface on a workpiece, said router having a rotatable bit protruding from the underside thereof, comprising,
    a pair of guide pins,
    means for securing the guide pins to the underside of said router at positions spaced apart from one another and radially spaced from the bit,
    said guide pins protruding from the underside of said router for continuous engagement with said guide surface as the router is advanced along the workpiece,
    said means for securing the guide pins comprising a subbase plate having a tool opening and a plurality of guide pin openings adapted to receive said guide pins and means for securing said subbase plate to the underside of the router with said tool opening positioned for protrusion of said bit through the center thereof,
    a plurality of tilt pins, at least one of said tilt pins being positioned on the subbase plate is spaced relation from said tool opening for supporting the subbase plate at a first height above said workpiece and another tilt pin positioned on the subbase plate on the opposite side of said tool opening for supporting the subbase plate at a second height whereby said subbase plate is tilted relative to said workpiece.

14. The apparatus of claim 13 wherein said tilt pins are adpated to be received in said guide pin openings.

15. An apparatus for guiding a router relative to a guide surface on a workpiece, said router having a rotatable bit protruding from the underside thereof, comprising,
    a pair of guide pins,
    means for securing the guide pins to the underside of said router at positions spaced apart from one another and radially spaced from the bit,
    said guide pins protruding from the underside of said router for continuous engagement with said guide surface as the router is advanced along the workpiece,
    said means for securing the guide pins comprising a subbase plate having a tool opening and a plurality of guide pin openings adapted to receive said guide pins and means for securing said subbase plate to the underside of the router with said tool opening positioned for protrusion of said bit through the center thereof,
    said guide pin openings including a plurality of pairs of holes aligned along a line disposed in intersecting relation with the center of said tool opening, the holes of each pair being arranged on opposite sides of and equidistant from the center of said tool opening.

16. A method of guiding a router along a workpiece having a guide surface thereon comprising,
    providing a pair of guide pins, securing said guide pins to the underside of the router in radially spaced relation from the cutting bit thereof, engaging said guide pins against said guide surface, moving said bit into working engagement with the face of the workpiece, and cutting a routed line in the face of said workpiece by maintaining said guide pins in engagement with said guide surface while simultaneously advancing said guide pins along said guide surface, said guide surface including a corner between first and second linear guide surfaces and wherein the step of advancing said guide pins along said guide surface includes advancing said guide pins along the first guide surface until one guide pin engages said corner, advancing said one guide pin along the second guide surface while simultaneously advancing the other guide pin along the first guide surface to the point of engagement with said corner thereby cutting an arcuate routed line in said workpiece, and advancing both guide pins along said second guide surface.

17. The method of claim 16 further comprising
providing a subbase plate having a tool opening and a plurality of guide pin openings therein, securing the subbase plate to the underside of the router with the bit protruding through said tool opening, and inserting said guide pins into a selected pair of said guide pin openings.

18. The method of claim 17 further comprising removing said guide pins from said selected pair of guide pin openings, inserting said guide pins into an alternate selected pair of guide pin openings, and cutting another routed line in the face of said workpiece.

* * * * *